United States Patent
Knight

[11] Patent Number: 5,944,145
[45] Date of Patent: Aug. 31, 1999

[54] VEHICLE POSITIONING DEVICE

[76] Inventor: Lewis L. Knight, 15748 Golfview Dr., Riverview, Mich. 48192

[21] Appl. No.: 08/943,702

[22] Filed: Oct. 3, 1997

[51] Int. Cl.[6] .................................................. B60T 3/00
[52] U.S. Cl. ............................................ 188/32; 188/4 R
[58] Field of Search ................................ 188/2 R, 4 R, 188/32; 410/30; 414/389, 396, 401, 584

[56] References Cited

U.S. PATENT DOCUMENTS

| | | |
|---|---|---|
| 1,768,265 | 6/1930 | Nicholls ..................................... 188/32 |
| 1,981,188 | 11/1934 | Pavitt ......................................... 116/28 |
| 2,011,469 | 8/1935 | Brueggemann ............................ 188/32 |
| 2,731,934 | 1/1956 | Hausmann et al. ........................ 116/28 |
| 2,771,162 | 11/1956 | Marsh ........................................ 188/32 |
| 2,895,569 | 7/1959 | Nystrom .................................... 188/32 |
| 2,998,102 | 8/1961 | Deverich ................................... 188/32 |
| 3,024,871 | 3/1962 | Stein .......................................... 188/32 |
| 3,219,972 | 11/1965 | Williams ................................... 340/61 |
| 3,625,313 | 12/1971 | Lowrie ..................................... 188/4 R |
| 3,858,690 | 1/1975 | Facemire ................................... 188/32 |
| 4,433,636 | 2/1984 | Crouch ...................................... 116/28 |
| 4,641,994 | 2/1987 | Hankison .................................. 188/32 |
| 5,040,302 | 8/1991 | Theising .................................... 33/286 |
| 5,231,392 | 7/1993 | Gust ....................................... 340/932.2 |
| 5,464,076 | 11/1995 | Benedetto ................................. 188/32 |

FOREIGN PATENT DOCUMENTS 140632  11/1980  Japan ...................................... 188/32

*Primary Examiner*—Chris Schwartz
*Attorney, Agent, or Firm*—Charles W. Chandler

[57] ABSTRACT

A wheeled vehicle can be positioned in a garage by a positioning device that includes a mounting bracket attachable to the garage floor, or garage wall near the floor, an elongated arm structure pivotably attached to the mounting bracket for swinging motion between an operating positioning along the floor and a stored position against the garage wall, and a tire-engageable ramp affixed to the elongated arm structure remote from the mounting bracket. The arm structure has an adjustable length for varying the spacing of the ramp from the garage wall.

6 Claims, 2 Drawing Sheets

5,944,145

VEHICLE POSITIONING DEVICE

BACKGROUND OF THE INVENTION

The field of the invention pertains to the positioning of one or several vehicles in a garage.

Typically, a vehicle is driven into the garage and the driver makes an estimate of the distance remaining between the front of the vehicle and the back wall of the garage. If the driver improperly estimates the distance, the vehicle can hit the wall, causing damage to the wall and to the vehicle itself. Most known distance estimating devices either hang from the ceiling of the garage or are permanently attached to the garage floor near the front of the vehicle. Those devices that are permanently attached to the garage floor block access to the floor and to the area in front of the vehicle. Some devices are flexible to allow the vehicle a range of area for positioning. No provision has been made for a floor or low mounted device that actually stops the forward movement of the vehicle to positively position the vehicle and yet be readily removable from the floor as needed. No provision has been made to make such a device that pivots from the floor into an upright compact storage position against the wall.

Although the need for a device to positively position a vehicle existed, I am unaware of such a device. Thus the need for a device to positively position a vehicle, which is easily pivoted into a storage position allowing complete access to the garage floor.

Examples of known prior art are shown in the following U.S. Pat. Nos. 3,625,313 to Lowrie for a chocking device; 5,231,392 to Gust for a portable vehicle parking assistance device; 5,040,032 to Theising for a hitch alignment means; 4,433,636 to Crouch for a dual warning parking aid; 3,219,972 to Williams for an automobile parking position indicator; 2,731,934 to Hausmann et al for a parking guide; and 1,981,188 to Pavitt for a vehicle position indicator.

The Lowrie patent discloses devices that swing down from the underside of a vehicle to engage the tire in front and in back. The Gust patent shows a portable device that rests on the floor and away from the wall. The device uses a motion sensor and indicator with audible and visible signals. The Theising patent teaches a wheel stop for aligning a hitch coupling of a trailer. The device is positioned on the ground while the trailer is still attached to the vehicle. When the trailer is to be re-hitched to the vehicle, the vehicle engages the device for proper alignment.

The Crouch patent shows a device that initially has the hood of the car contacting a ball and then, the bumper contacting a flexible vertical part of the device. The Williams patent shows a wall mounted device with an indicator arm that is deflected by a vehicle, triggering an indicator light. The Hausmann et. al. patent discloses a wall mounted pivot point. An indicating arm is operated by car deflection of an actuating arm. The Pavitt patent shows a device that is either floor mounted or hangs down from the wall for deflection by a vehicle. Although these patents indicate the location of the vehicle, they do not block the motion of the vehicle in the desired location while yet being easily movable to a stored position.

SUMMARY OF THE INVENTION

It is an object of the invention to provide a vehicle positioning device that is useful in a garage to positively position a vehicle, both consistently and reliably.

It is an object of the invention to provide a vehicle positioning device that protects the garage wall.

It is an object of the invention to provide a device for warning the driver that the vehicle is approaching a garage wall.

It is also an object of the invention to provide a vehicle positioning device that is pivotable to a storage position against the wall of the garage, for convenient access to the garage floor.

The invention comprises a device for positioning a vehicle in a garage using a simple procedure.

The preferred embodiment of the invention has a mounting bracket, extension arms and a ramp. The mounting bracket is affixed either to the floor of the garage adjacent a wall or to the wall itself, slightly above the floor. The mounting bracket has a back, two arms and a flange or flanges between the back and the arms. Mounting holes for either location are placed on the back and the flange. A spacer can be used if the bracket is mounted to the wall. The spacer is useful if there is a molding at the bottom of the wall.

Extension arms pivot from the mounting bracket to allow the device to be swung up against the wall. The extension arms have an adjustable length. An angled ramp is attached to the ends of the extension arms. The angled ramp engages the vehicle tire.

The device is preferably made from cold rolled steel however, aluminum or plastic components are possible, in a high visibility color. End caps formed from a resilient material are applied to the ends of the angled ramp to prevent scratching or marring the floor or the wall. Similarly, clips can be added to all the parts of the device that engage the floor or wall to prevent scratching these surfaces.

One version of the device has one mounting bracket with two extension arms connected to the ramp. The ramp is approximately 20 inches in length, a sufficient length to engage the tire of a single vehicle.

Another version has two mounting brackets with two extension arms per each bracket. The mounting brackets are spaced approximately 50¾ inches apart from outside edge to outside edge of the brackets. A longer angled ramp is connected to the ends of the extension arms. The length of the ramp is approximately 62 inches. This version is suitable for locating two cars. The placement of the mounting brackets can be altered for different width vehicles or for various garage sizes.

The device is lowered to the operating position on the floor. The distance from the wall to the tire's parking position is set by adjusting the length of the extension arms. The device then remains on the floor to properly space the vehicle from the wall when the vehicle enters the garage. The ramp has one hundred five degrees front angle with respect to the floor. As the tire of the vehicle encounters the ramp, the forward motion of the tire is directed by the ramp toward the floor, and away from the wall. The resultant feel of the tire engaging the ramp warns the driver to release the accelerator to stop the forward motion of the vehicle.

When not being used, the device is pivoted from the floor into an upright stored position against the wall. To maintain the device in the stored position, eye bolts are affixed to the wall. A resilient cord is stretched between the eye bolts and around the extension arms.

For a more complete understanding of the present invention, reference is made to the following detailed description when read in conjunction with the accompanying drawings wherein like reference characters refer to like elements throughout the several views.

BRIEF DESCRIPTION OF THE DRAWINGS

The description refers to the accompanying drawings in which like reference characters refer to like reference parts throughout the several views, and in which.

DESCRIPTION OF THE PREFERRED EMBODIMENT

Figure 1:
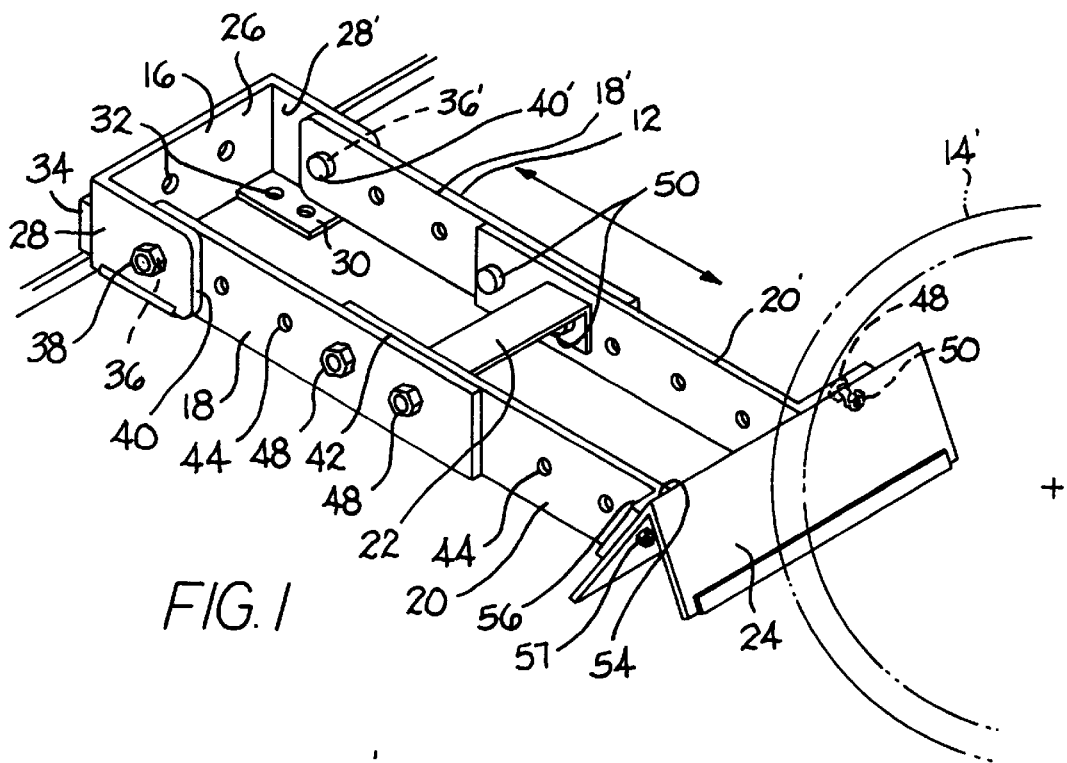
FIG. 1 illustrates a perspective view of a first embodiment of the invention having a single mounting bracket in the operating position.

FIGS. 1–4 show a device 12 for positioning a vehicle by blocking the motion of a tire 14 (shown in phantom) of the vehicle. Device 12 comprises a mounting bracket 16, extension arms 18, 18', mating extension arms 20, 20', an extension support bracket 22 and an angled ramp 24. All components are preferably formed of cold rolled steel, or out of a structural steel, such as angle iron, or square aluminum tubing. The exterior arms are preferably formed of a two inch structural angle.

As is shown in FIG. 1, mounting bracket 16 has a back 26, two arms 28, 28' and a flange 30 between back 26 and arm 28, 28'. Fastener holes 32 are disposed through back 26 and flange 30 for fastening mounting bracket 16 to the garage wall or to the garage floor near the garage wall. A spacer 34 can be used if a molding is present at the base of the wall. Arms 28, 28' have pivot holes 36, 36' and arms 18 have fastening holes 40, 40' for receiving fasteners 38, 38'. Extension arms 18, 18' pivot around fasteners 38, 38' in pivot holes 36, 36' of mounting bracket 16.

Extension arms 18, 18' and mating extension arms 20, 20' have means for adjusting their overall length. Holes 44 are on 4 inch centers and extend through both extension arms 18, 18' and mating extension arms 20, 20'. Extension arms 20, 20' are slid along extension arms 18, 18' until the desired overall length is reached. Then, a pair of nuts 48 and bolts 50 are tightened to lock each pair of the extension arms at the desired length. Tubular telescopic arms could also be employed.

Support bracket 22 is disposed laterally between extension arms 18, 18'. Bracket 22 is locked in place using nuts 48 and bolts 50 (as described above) through fastener holes 44 of the extension arms 18, 18' and mating extension arms 20, 20'. Bracket 22 laterally supports the arms.

Extension arms 20, 20' have end flanges 56 that fit against ramp 24. Ramp 24 is attached to the end flanges 56 of extension arms 20, 20' by nuts 48 and bolts 50 through openings 57. Other means could be used, such as welding.

Figure 2:
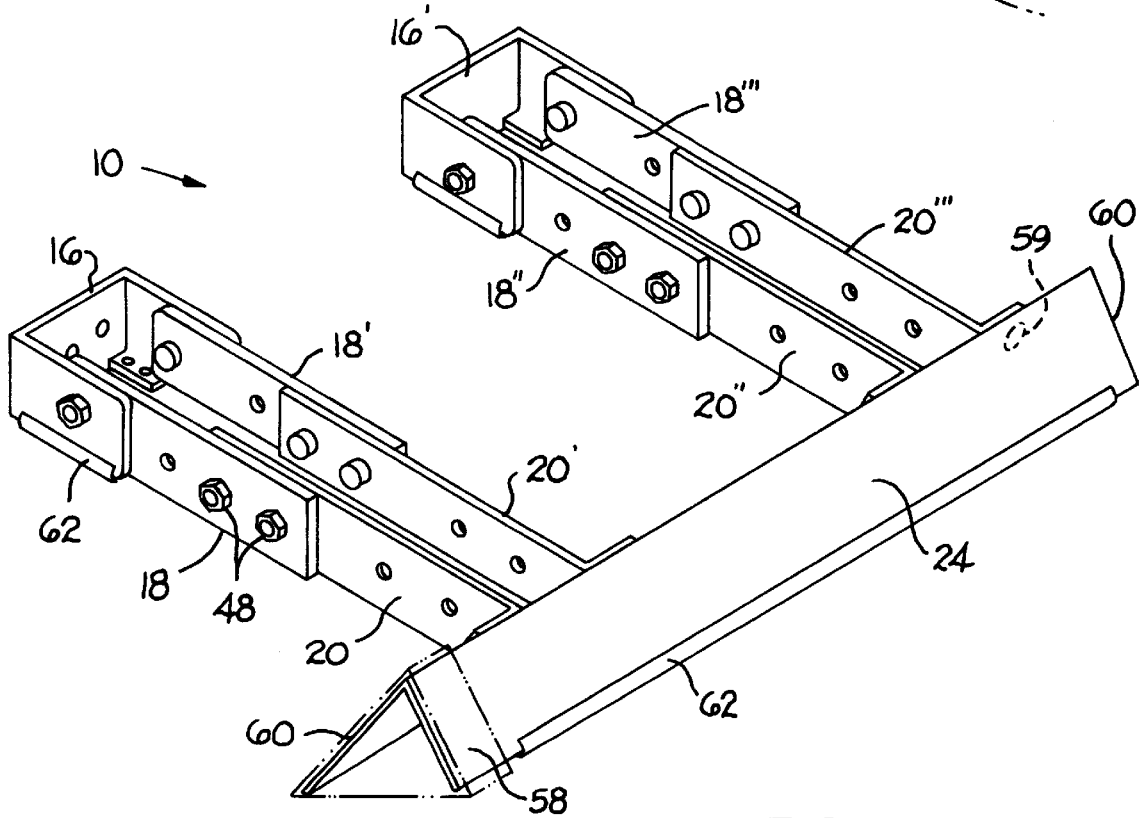
FIG. 2 illustrates a perspective view of a second embodiment having two mounting brackets.

FIG. 2 shows positioning device 12 used for two vehicles. Ramp 24 has a greater width and is engaged by four mating extension arms 20, 20', 20", 20'" that are connected with four extension arms 18, 18', 18", 18'" which are attached to two mounting brackets 16, 16'.

Figure 3:
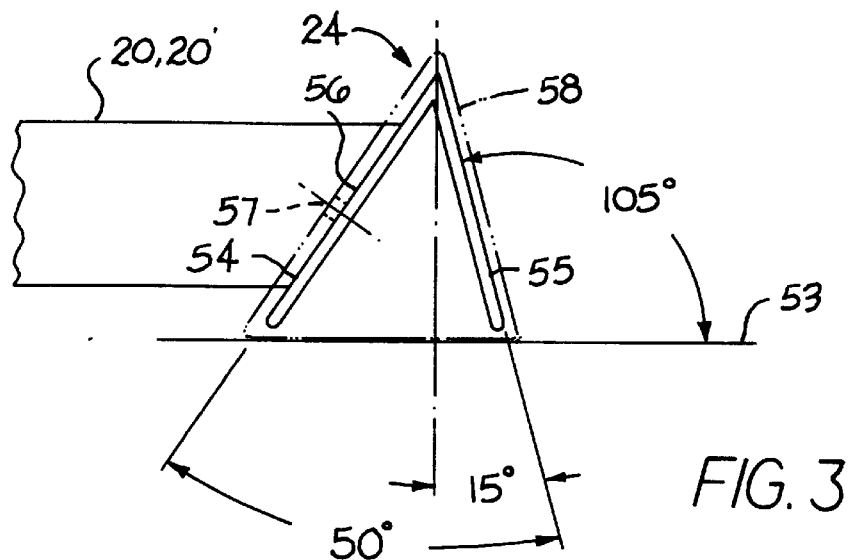
FIG. 3 illustrates a side view of the ramp.

FIG. 3 best shows ramp 24 as having an apex 52 and two downwardly facing surfaces 54, 55. Surfaces 54, 55 engage the floor of the garage. Front surface 55 engages the vehicle tire at such an angle that the major portion of the momentum of the vehicle is directed toward floor 53. An end cap 58 (shown in phantom) is placed on each end 60 of the angled ramp 24 to protect the garage floor and the tire of the vehicle. Each end cap 58 is formed to grasp the inside of the ramp as well as the outside for better retention on the ramp.

Clips 62 fit on the edges of the device that touch the garage floor. Clips 62 protect the garage floor by preventing marring thereof. Clips 62 could also be used on the end of ramp 24 instead of the end caps.

Figure 4:
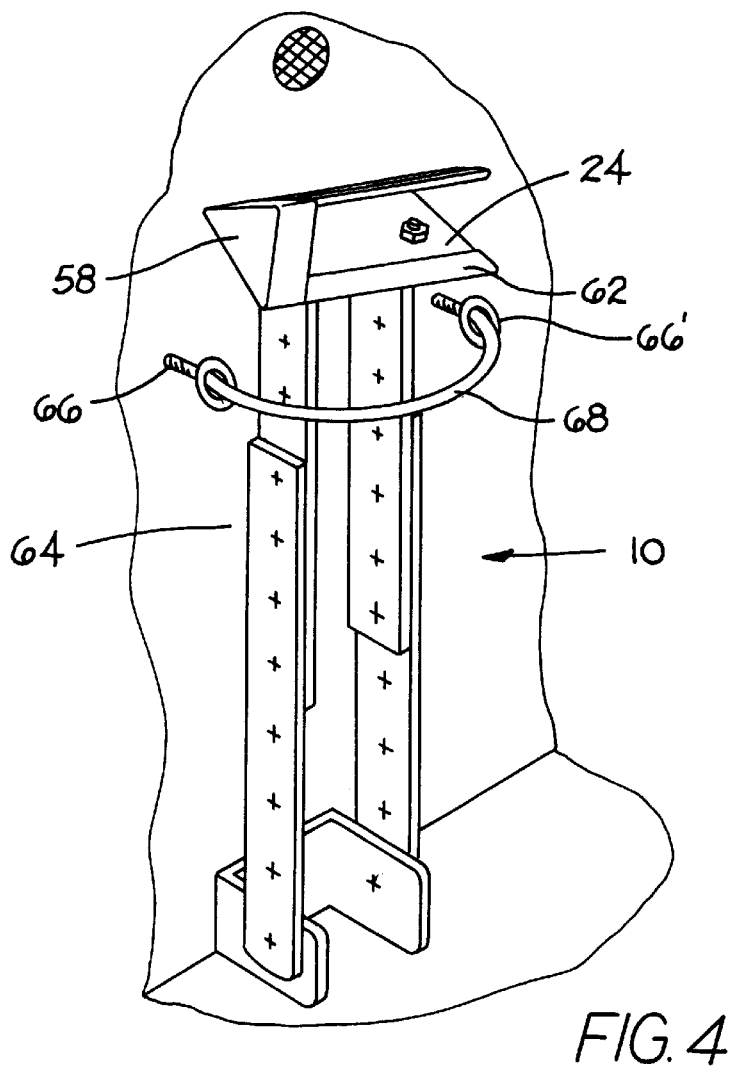
FIG. 4 illustrates a side view of the first embodiment in the stored position.

Positioning device 12 is shown in the stored position 64 in FIG. 4. To reach the stored position 64, extension arms 18, 18' are pivoted around fasteners 38, 38' inserted through the arms of mounting bracket 16. Extension arms 18, 18' lean towards the wall, with apex 52 of the ramp 24 resting against the wall.

Eye bolts 66, 66' are affixed to the wall to support a resilient cord 68. The cord connected to the eye bolts 66, 66' around the extension arms, to retain positioning device 10 in the stored position. Other forms of retaining devices can be used such as ball push pin that can be inserted in aligned holes in the extension arms. Push pins could also be used to replace the various fasteners, where appropriate.

Preferably a marker 70 is placed on the wall of the garage at such a height and location so that the driver when aligning the marker with the steering wheel will be able to guide the vehicle toward the positioning device.

Having described my invention, many modifications thereto will become apparent to those skilled in the art to which it pertains without deviating from the spirit of the invention as defined in the appended claims.

I claim:

1. A device for positioning a vehicle in a garage, wherein the vehicle has tires, and the garage has a floor and an upstanding wall; said device comprising;

a mounting bracket having means thereon for affixing the bracket at a mounting location either on the garage floor near the garage upstanding wall, or on the garage upstanding wall near the garage floor;

an adjustable length arm structure pivotably attached to said mounting bracket for swinging motion between an operating position extending along the garage floor surface and a stored position against the upstanding wall surface of the garage;

a ramp affixed to said adjustable length arm structure remote from said mounting bracket;

said ramp having a tire-engageable surface adapted to extend upwardly from the garage floor when said adjustable length arm structure is in the operating position;

said adjustable length arm structure comprising a first elongated member attached to said bracket and a second elongated member attached directly to a backside of said ramp; and said second elongated member being slidable on said first elongated member to vary the length of said arm structure.

2. The vehicle positioning device of claim 1, and further comprising means for locking said first and second elongated members in selected positions of slidable adjustment.

3. The vehicle positioning device of claim 2, wherein said locking means comprises a nut-bolt means extendable transversely through said first and second elongated members.

4. The vehicle positioning device of claim 1, and further comprising spacer means carried by said bracket for spacing said bracket away from the garage wall when the bracket is to be mounted on the garage wall.

5. The vehicle positioning device of claim 1, and further comprising means for preventing said ramp from directly contacting the garage floor surface when said adjustable length arm structure is in its operating position; said contact-prevention means comprising end caps encircling end portions of said ramp.

6. The vehicle positioning device of claim 1, wherein said ramp has spaced lower edges adapted to register with the garage floor surface when said adjustable length arm structure is in its operating position; and means for preventing said ramp from directly contacting the garage floor surface; said contact-prevention means comprising clip means extending along the ramp lower edges.

* * * * *